United States Patent
Vasquez et al.

(10) Patent No.: US 8,019,914 B1
(45) Date of Patent: Sep. 13, 2011

(54) DISK DRIVE IMPLEMENTING SHARED BUFFER MEMORY WITH REDUCED INTERRUPT LATENCY

(75) Inventors: Steven R. Vasquez, Rancho Santa Margarita, CA (US); Carl E. Bonke, Laguna Niguel, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 1101 days.

(21) Appl. No.: 11/246,652

(22) Filed: Oct. 7, 2005

(51) Int. Cl.
*G06F 3/00* (2006.01)
*G06F 5/00* (2006.01)

(52) U.S. Cl. ............... 710/36; 710/39; 710/52

(58) Field of Classification Search .......... 710/36, 710/39, 52
See application file for complete search history.

(56) References Cited

U.S. PATENT DOCUMENTS

| | | | |
|---|---|---|---|
| 4,250,546 A | | 2/1981 | Boney et al. |
| 4,342,095 A | * | 7/1982 | Goodman ............... 711/219 |
| 4,409,654 A | | 10/1983 | Wada et al. |
| 4,683,549 A | | 7/1987 | Takaki |
| 4,791,557 A | | 12/1988 | Angel et al. |
| 5,185,871 A | | 2/1993 | Frey et al. |
| 5,301,312 A | | 4/1994 | Christopher, Jr. et al. |
| 5,465,343 A | | 11/1995 | Henson et al. |
| 6,438,629 B1 | | 8/2002 | Huebner et al. |
| 6,591,350 B1 | | 7/2003 | Stenfort |
| 6,785,803 B1 | | 8/2004 | Merchant et al. |
| 6,895,475 B2 | | 5/2005 | Volpe et al. |
| 7,310,196 B1 | * | 12/2007 | Schreck et al. ............... 360/75 |
| 2002/0065994 A1 | * | 5/2002 | Henson et al. ............... 711/151 |

OTHER PUBLICATIONS

Kanellos, Micheal, "Hybrid drive to extend notebook battery life", Apr. 26, 2005, CNET News.com, <http://news.zdnet.co.uk/hardware/0,1000000091,39196323,00.htm>.*

* cited by examiner

*Primary Examiner* — Chun-Kuan Lee
*Assistant Examiner* — Zachary K Huson

(57) ABSTRACT

A disk drive is disclosed having a disk, a head actuated over the disk, a buffer memory for storing control routine op codes and control routine data, and a microprocessor for receiving the control routine op codes and control routine data. Control circuitry within the disk drive services an access request generated by the microprocessor by accessing the buffer memory, and monitors at least one interrupt. If the interrupt occurs while servicing the access request, the control circuitry enables the microprocessor to execute an interrupt service routine corresponding to the interrupt. Enabling the microprocessor to execute the interrupt service routine rather than wait for the access request reduces the latency in servicing the interrupt.

25 Claims, 11 Drawing Sheets

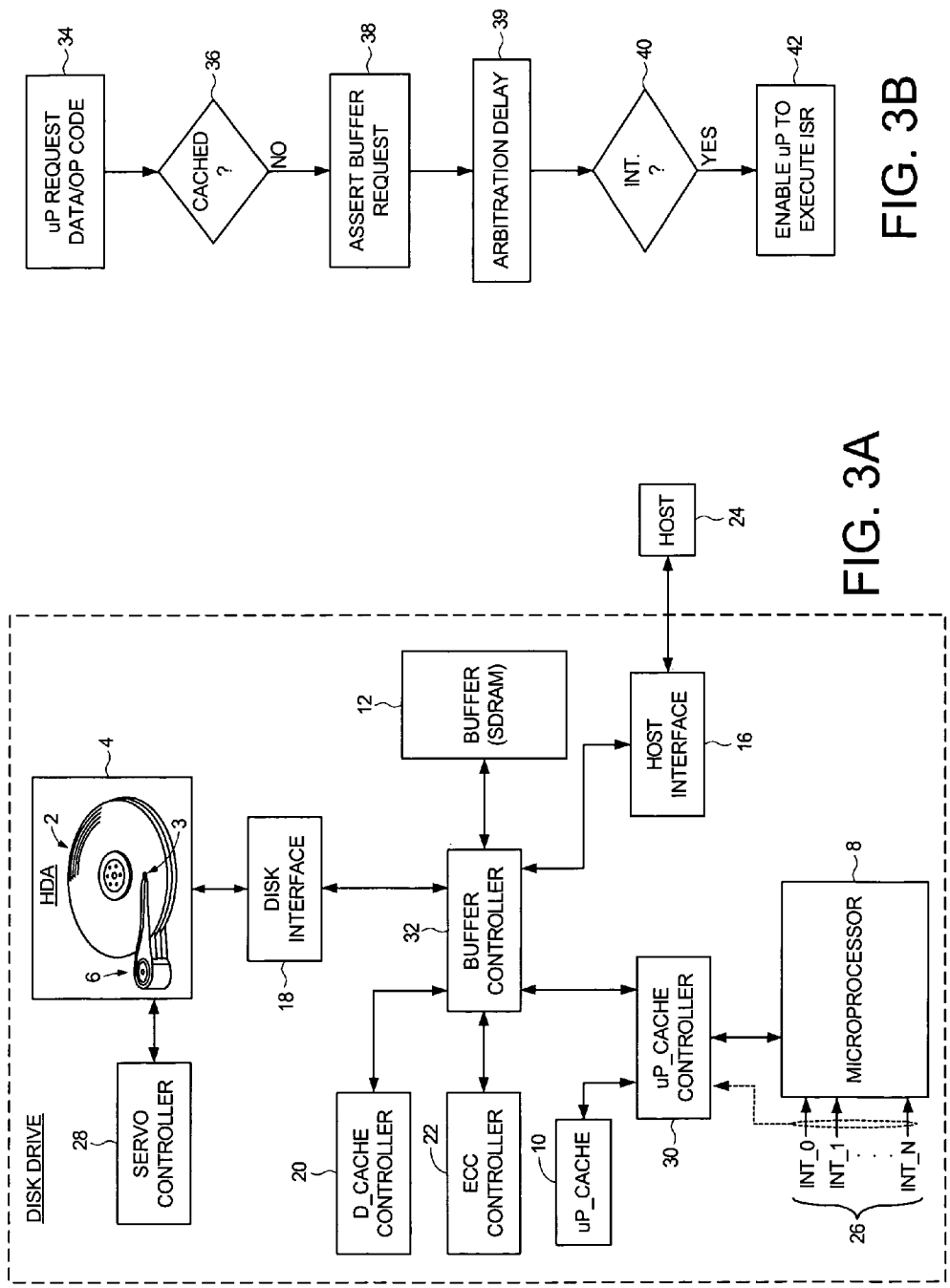

DISK DRIVE IMPLEMENTING SHARED BUFFER MEMORY WITH REDUCED INTERRUPT LATENCY

BACKGROUND OF THE INVENTION

1. Field of the Invention

The present invention relates to disk drives for computer systems. More particularly, the present invention relates to a disk drive implementing shared buffer memory with reduced interrupt latency.

2. Description of the Prior Art

FIG. 1 shows an example configuration of a prior art disk drive wherein one or more disks 2 and heads 3 are housed in a head disk assembly (HDA) 4. The HDA 4 also houses a voice coil motor (VCM) 6 for rotating one or more actuator arms about a pivot in order to actuate the heads 3 over the respective disk surfaces. A printed circuit board (PCB) is mounted to the HDA 4, wherein one or more integrated circuits for controlling operation of the disk drive are mounted on the PCB, including a microprocessor (uP) 8 for executing code segments of a control routine. The microprocessor 8 typically accesses a fast uP cache 10 (e.g., an SRAM) through a uP cache controller 11 which caches control routine op codes being executed as well as control routine data.

The code segments of the control routine are typically stored on the disk 2 and loaded into an external buffer memory 12 (e.g., an SDRAM) when the disk drive is powered on. As the microprocessor 8 executes the control routine, the uP cache controller 11 transfers a burst of corresponding control routine op codes from the external buffer memory 12 into the uP cache 10 for fast access by the microprocessor 8. Since the buffer memory 12 is typically shared with other control components, a buffer controller 14 implements an arbitration algorithm to arbitrate access to the buffer memory 12. Example control components that may share access to the buffer memory 12 include a host interface 16, a disk interface 18, a data cache controller 20, and an ECC controller 22, one or more of which may be integrated with the microprocessor 8 in a system on a chip (SOC), or implemented as separate integrated circuits.

The host interface 16 facilitates data transfer between the disk drive and a host 24 during read and write operations. That is, during read operations data read from the disk 2 is staged in the buffer memory 12 before the host interface 16 transmits the read data to the host 24, and during write operations data received from the host 24 is staged in the buffer memory 12 before being written to the disk 2. The disk interface 18 performs the actual interface functions with the HDA 4 in order to write data stored in the buffer 12 to the disk 2, and store data into the buffer 12 that is read from the disk 2. The data cache controller 20 accesses a data cache area of the buffer memory 12 in order to implement a suitable user data caching algorithm, and the ECC controller 22 implements a suitable error correction algorithm on data read from the disk 4 and stored in the buffer 12.

The buffer controller 14 assigns a priority level to each control component attempting to access the buffer memory 12 so that the more time critical components are granted accesses soonest. For example, the disk interface 18 may be given the highest priority in the arbitration scheme so that disk accesses are serviced in synchronism with the disk 2 rotating. Otherwise there would be an undesirable latency due to slipped revolutions when reading or writing data blocks to the disk. Similarly, the host interface 16 may be given a high priority in order to minimize any perceived access latency by the end user. This means the uP cache controller 11 is given a priority level lower than a number of other control components, and therefore the microprocessor 8 may encounter a long arbitration delay if components of higher priority are attempting a concurrent access to the buffer memory 12.

The microprocessor 8 is held in a wait state while the uP cache controller 11 is waiting to access the buffer memory 12, which prevents the microprocessor 8 from servicing what may be time critical interrupts 26. For example, a servo controller 28 may generate an interrupt at each servo wedge, signaling the microprocessor 8 that it is time to compute an updated VCM 6 control command for positioning the head 3, or a spindle motor command for controlling the rotational speed of the disk 2. Any delay before the microprocessor 8 services these interrupts reduces the performance of the closed-loop servo systems.

There is, therefore, a need to reduce the interrupt latency in a disk drive that employs a shared buffer memory.

SUMMARY OF THE INVENTION

An embodiment of the present invention comprises a disk drive having a disk, a head actuated over the disk, and a buffer memory for storing control routine op codes and control routine data. The disk drive further comprises a microprocessor operable to receive the control routine op codes and control routine data, and control circuitry for servicing an access request generated by the microprocessor by accessing the buffer memory, and for monitoring an interrupt. If the interrupt occurs while servicing the access request, the control circuitry enables the microprocessor to execute an interrupt service routine corresponding to the interrupt.

In one embodiment, the control circuitry asserts a wait state to the microprocessor while servicing the access request.

In one embodiment, the control circuitry is further operable to enable the microprocessor to execute the interrupt service routine by returning a jump op code to the microprocessor for jumping to a parking routine. In another embodiment, the control circuitry is further operable to store a return address in the parking routine, wherein the return address corresponds to an address of an op code the microprocessor was waiting to receive when the interrupt occurred. In yet another embodiment, the control circuitry is further operable to enable the microprocessor to execute the interrupt service routine by returning an interrupt op code. In another embodiment, the control circuitry is further operable to enable the microprocessor to execute the interrupt service routine by returning a subroutine call op code. In still another embodiment, the control circuitry is further operable to enable the microprocessor to execute the interrupt service routine by asserting a memory exception.

In another embodiment, the disk drive further comprises a uP cache for caching the control routine op codes read from the buffer memory, and the control circuitry comprises a uP cache controller for transmitting the control routine op codes from the buffer memory to the uP cache. In one embodiment, the control circuitry further comprises a buffer controller for arbitrating access to the buffer memory by the uP cache controller and at least one other component, wherein an arbitration delay occurs when the uP cache controller waits for the buffer controller to grant access to the buffer memory. In one embodiment, the at least one other component that accesses the buffer memory includes at least one of a disk interface, a host interface, a data cache controller, and an error correction code (ECC) controller.

In one embodiment, if the arbitration delay is less than a predetermined threshold, the control circuitry waits for the arbitration delay when the interrupt occurs rather than enable the microprocessor to execute the interrupt service routine. In another embodiment, if the control circuitry is waiting to read the control routine data from the buffer memory, the control circuitry waits for the arbitration delay when the interrupt occurs rather than enable the microprocessor to execute the interrupt service routine.

In still another embodiment, the uP cache controller transfers only complete control routine op codes from the uP cache to the microprocessor.

In another embodiment, the buffer memory stores user data received from a host and written to the disk during a write operation, and user data read from the disk and transferred to the host during a read operation.

In yet another embodiment, the control circuitry further comprises a buffer controller for arbitrating access to the buffer memory, and an arbitration delay occurs when the microprocessor waits for the buffer controller to grant access to the buffer memory.

In still another embodiment, the buffer memory comprises a FLASH memory, and the disk drive comprises a uP cache operable to cache the control routine op codes read from the FLASH memory. The control circuitry transmits the control routine op codes from the FLASH memory to the uP cache.

Another embodiment of the present invention comprises a method of reducing interrupt latency in a disk drive. The disk drive comprises a disk, a head actuated over the disk, a buffer memory for storing control routine op codes and control routine data, and a microprocessor for receiving the control routine op codes and control routine data. The microprocessor generates an access request, and the access request is serviced by accessing the buffer memory. If an interrupt occurs while servicing the access request, the microprocessor is enabled to execute an interrupt service routine corresponding to the interrupt.

Another embodiment of the present invention comprises control circuitry for use in an information storage device comprising a buffer memory for storing control routine op codes and control routine data, and a microprocessor operable to receive the control routine op codes and control routine data. The control circuitry services an access request generated by the microprocessor by accessing the buffer memory, and monitors at least one interrupt. If the interrupt occurs while servicing the access request, the control circuitry enables the microprocessor to execute an interrupt service routine corresponding to the interrupt.

BRIEF DESCRIPTION OF THE DRAWINGS

FIG. 3A shows a disk drive according to an embodiment of the present invention further comprising a uP cache controller for servicing the access request generated by the microprocessor, and a buffer controller for arbitrating access to the buffer memory by the uP cache controller and other components.

FIG. 3B is a flow diagram executed by the control circuitry of FIG. 3A wherein if an interrupt occurs during an arbitration delay, the uP cache controller enables the microprocessor to execute an interrupt service routine corresponding to the interrupt.

DESCRIPTION OF THE PREFERRED EMBODIMENTS

Figure 2B:
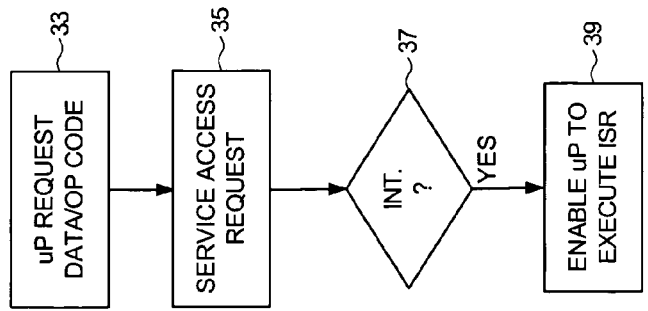
FIG. 2B is a flow diagram executed by the control circuitry in the disk drive of FIG. 2A wherein if an interrupt occurs while servicing an access request generated by the microprocessor, the microprocessor is enabled to execute an interrupt service routine corresponding to the interrupt.
Figure 2A:
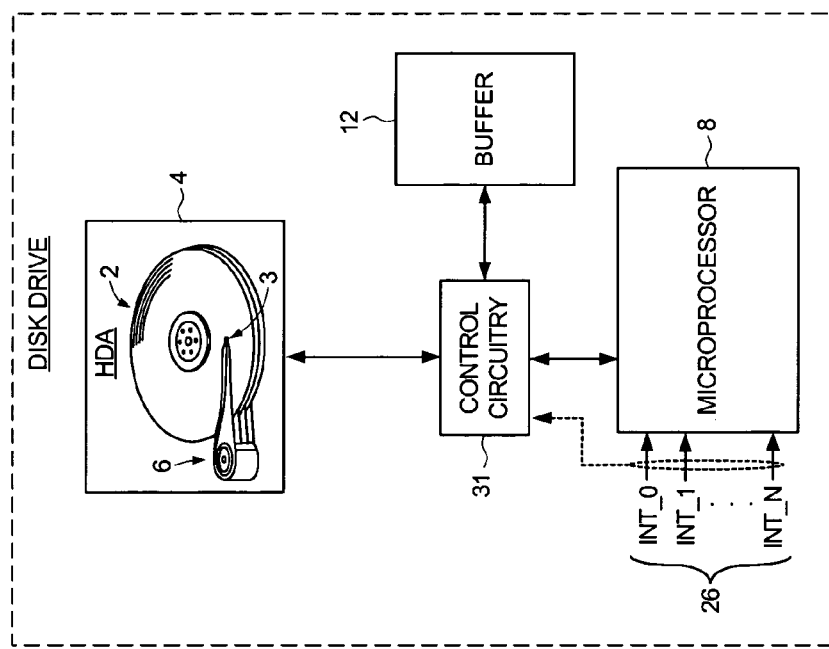
FIG. 2A shows a disk drive according to an embodiment of the present invention comprising a disk, a head actuated over the disk, a buffer memory for storing control routine op codes and control routine data, and a microprocessor operable to receive the control routine op codes and control routine data.

FIG. 2A shows a disk drive according to an embodiment of the present invention comprising a disk 2, a head 3 actuated over the disk 2, and a buffer memory 12 for storing control routine op codes and control routine data. The disk drive further comprises a microprocessor 8 operable to receive the control routine op codes and control routine data, and control circuitry 31 for servicing an access request generated by the microprocessor 8 by accessing the buffer memory 12, and for monitoring at least one interrupt 26. Referring to the flow diagram of FIG. 2B, at step 33 the control circuitry 31 receives an access request from the microprocessor 8, and at step 35 the control circuitry 31 services the access request. If the interrupt occurs at step 37 while servicing the access request, at step 39 the control circuitry 31 enables the microprocessor 8 to execute an interrupt service routine corresponding to the interrupt.

Although a preferred embodiment of this invention is described in the context of a disk drive, it will be well understood by those skilled in the art that other embodiments may be implemented in other information storage devices, such as magnetic tape drives, optical disk drives, FLASH Memory drives, etc.

Any suitable control circuitry 31 may be employed to implement the embodiments of the present invention. In one embodiment, the control circuitry 31 comprises a microprocessor executing instructions, the instructions being operable to cause the microprocessor to perform the steps of FIG. 2B as well as other functions described herein. The instructions may be stored in any computer-readable medium. In one embodiment, they may be stored on a non-volatile semiconductor memory external to the microprocessor, or integrated with the microprocessor in a system on a chip (SOC). In another embodiment, the instructions are stored on the disk 2 and read into a volatile semiconductor memory when the disk drive is powered on. In yet another embodiment, the control circuitry 31 comprises suitable logic circuitry, such as state machine circuitry.

Any suitable technique may also be employed in the embodiments of the present invention for enabling the microprocessor 8 to execute an interrupt service routine corresponding to the interrupt. In one embodiment described below with reference to FIG. 5A, the control circuitry 31 enables the microprocessor 8 to execute the interrupt service routine by returning a jump op code to the microprocessor 8 for jumping to a parking routine. In another embodiment, the control circuitry 31 stores a return address in the parking routine, wherein the return address corresponds to an address of an op code the microprocessor 8 was waiting to receive when the interrupt occurred. In yet another embodiment, the control circuitry enables the microprocessor 8 to execute the interrupt service routine by returning an interrupt op code. Executing the interrupt op code automatically saves the return address so that the microprocessor 8 returns to the correct state after executing the interrupt service routine. In a similar embodiment illustrated in FIG. 5B, the control circuitry 31 returns a subroutine call op code to enable the microprocessor 8 to execute the interrupt service routine. In still another embodiment, the control circuitry 31 enables the microprocessor 8 to execute the interrupt service routine by asserting a memory exception, an example of which is explained in greater detail below.

FIG. 3A shows a disk drive according to an embodiment wherein the control circuitry 31 comprises a uP cache controller 30 for servicing the access request generated by the microprocessor 8, and a buffer controller 32 for arbitrating access to the buffer memory 12 by the uP cache controller 30 and at least one other component. In one embodiment, the at least one other component that accesses the buffer memory 12 includes at least one of a disk interface 18, a host interface 16, a data cache controller 20, and an error correction code (ECC) controller 22. The data cache controller 20 accesses a data cache area of the buffer memory 12 in order to implement a suitable user data caching algorithm. That is, the buffer memory 12 is operable to store user data received from the host 24 and written to the disk 2 during a write operation, and user data read from the disk 2 and transferred to the host 24 during a read operation. The ECC controller 22 implements a suitable error correction algorithm on user data read from the disk 4 and stored in the buffer memory 12.

A uP cache 10 caches the control routine op codes read from the buffer memory 12. The uP cache controller 30 transmits the control routine op codes from the buffer memory 12 to the uP cache 10, and the microprocessor 8 executes the control routine op codes stored in the uP cache 10. An arbitration delay occurs when the uP cache controller 30 waits for the buffer controller 32 to grant access to the buffer memory 12. The uP cache controller 30 monitors at least one interrupt 26, and if the interrupt occurs during the arbitration delay, the uP cache controller 30 enables the microprocessor 8 to execute an interrupt service routing corresponding to the interrupt.

FIG. 3B is a flow diagram executed by the uP cache controller 30 according to an embodiment of the present invention. At step 34 the uP cache controller 30 receives an access request from the microprocessor 8 to read data (control routine op code or control routine data) from the uP cache 10. If at step 36 the requested data is not cached, then at step 38 the uP cache controller 30 asserts a buffer request to the buffer controller 32 to access the buffer memory 12. At step 39 an arbitration delay occurs while the uP cache controller 30 waits for the buffer controller 32 to grant access to the buffer memory 12. If during the arbitration delay an interrupt 26 is asserted at step 40, then at step 42 the uP cache controller 30 enables the microprocessor 8 to execute the corresponding interrupt service routine.

Any suitable integrated circuit (IC) configuration may be employed in the embodiments of the present invention. That is, the components shown in FIG. 3A (microprocessor 8, uP cache 10, uP cache controller 30, host interface 16, etc.) may be partitioned into a number of different ICs, or they may be integrated into a single IC or system on a chip (SOC). In one embodiment, the uP cache 10 is integrated with the microprocessor 8 to enable fast access, while the buffer memory 12 is implemented in a separate external IC. In addition, each of the other components may be implemented using any suitable circuitry, such as with microprocessor 8 or additional microprocessors executing code segments, or with suitable state machine circuitry.

Figure 1:
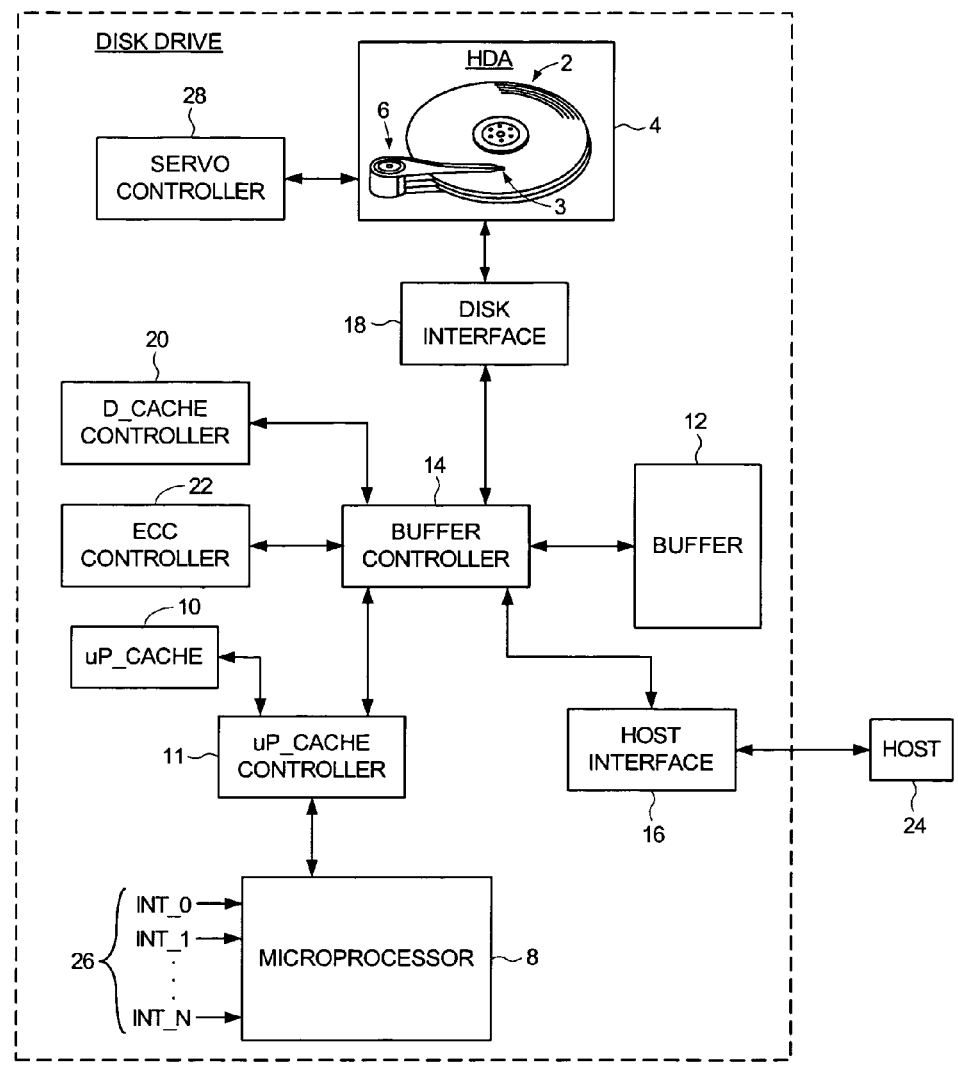
FIG. 1 shows a prior art disk drive comprising a uP cache controller and a number of other components that share access to a buffer memory, wherein an arbitration delay in accessing the buffer memory may delay servicing a time critical interrupt.

In one embodiment, to implement the uP cache controller 30 of FIG. 3A, the conventional uP cache controller 11 of FIG. 1 is modified to receive and monitor the interrupts 26 that are applied to the microprocessor 8. The uP cache controller 30 may also comprise suitable circuitry for enabling the microprocessor 8 to execute the interrupt service routine if an interrupt occurs during the arbitration delay. In one embodiment, the uP cache controller 30 also comprises suitable circuitry for monitoring the arbitration delay (received from the buffer controller 32) and enabling the microprocessor 8 to execute the interrupt service routine when an interrupt occurs only if the arbitration delay exceeds a predetermined threshold. In yet another embodiment, the uP cache controller 30 comprises suitable circuitry to enable the microprocessor 8 to execute the interrupt service routine when the interrupt occurs only if the microprocessor 8 is requesting a control routine op code from the uP cache controller 30 (as opposed to requesting control routine data).

Figure 4A:
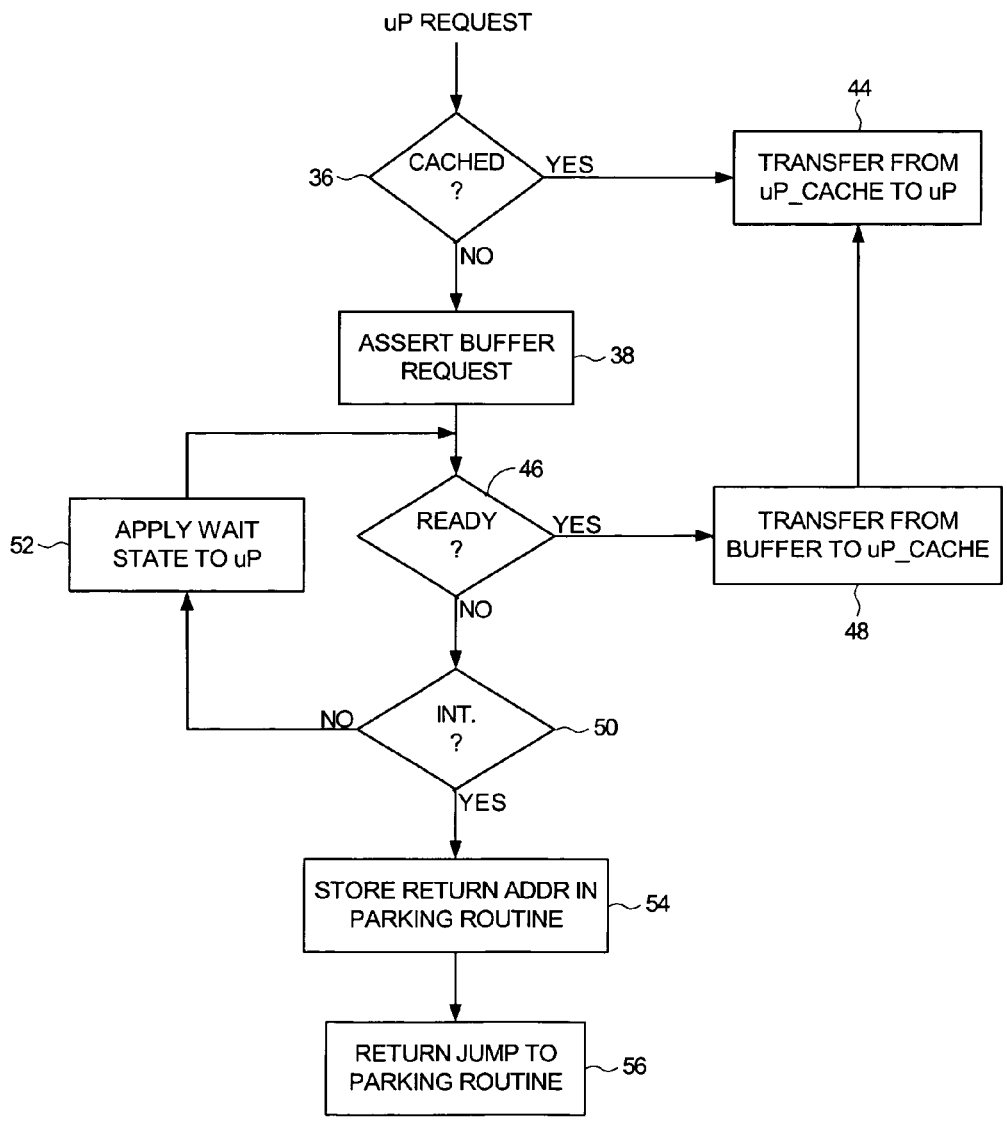
FIG. 4A is a more detailed flow diagram according to an embodiment of the present invention wherein the uP cache controller asserts wait states to the microprocessor during the arbitration delay, and returns a jump op code for jumping to a parking routing to enable the microprocessor to service an interrupt.

FIG. 4A shows a more detailed flow diagram executed by the uP cache controller 30 when an access request is received from the microprocessor 8 according to an embodiment of the present invention. If at step 36 the requested data is cached in the uP cache 10, then at step 44 the requested data is transferred from the uP cache 10 to the microprocessor 8. However, if the requested data is not cached at step 36, then at step 38 the uP cache controller 30 asserts a buffer request to the buffer controller 32 to read the requested data from the buffer memory 12. If at step 46 the buffer controller 32 grants the uP cache controller 30 access to the buffer memory 12, then at step 48 the uP cache controller 30 transfers the requested data from the buffer memory 12 into the uP cache 10, and at step 44 transfers the requested data from the uP cache 10 to the microprocessor 8. If at step 46 the uP cache controller 30 is waiting to access the buffer memory 12 during the arbitration delay, and at step 50 no interrupts are being asserted, then at step 52 the uP cache controller 30 asserts a wait state to the microprocessor 8. If at step 50 an interrupt occurs while the uP cache controller 30 is waiting to access the buffer memory 12 during the arbitration delay, then at step 54 the uP cache controller 30 stores a return address in the parking routine, wherein the return address corresponds to an address of an op code the microprocessor 8 was waiting to read when the interrupt occurred (see description of FIG. 5A). At step 56 the uP cache controller 30 returns a jump op code to the microprocessor 8 for jumping to the parking routine which enables the microprocessor 8 to execute an interrupt service routine corresponding to the interrupt.

Figure 4B:
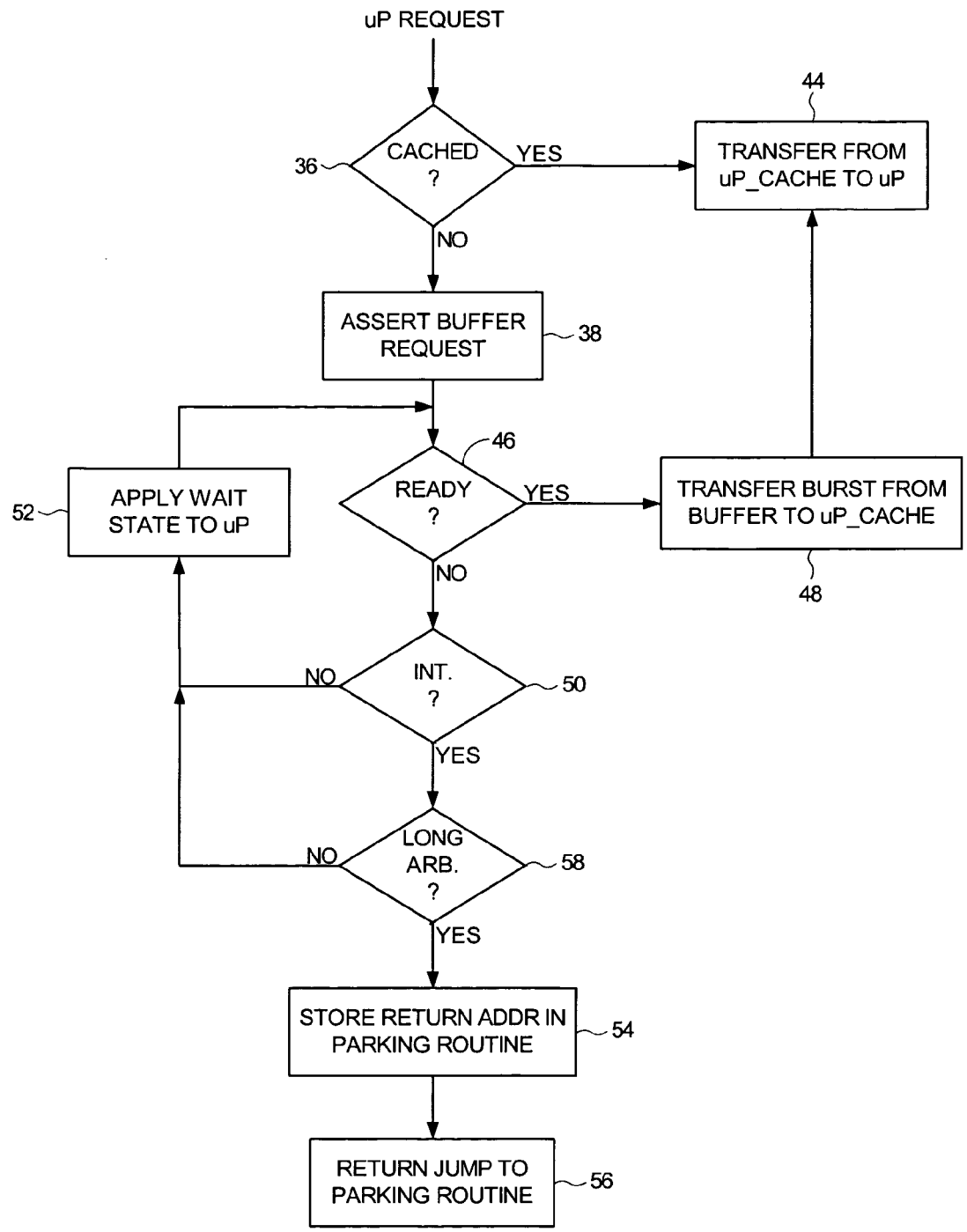
FIG. 4B is an extended flow diagram according to an embodiment of the present invention wherein if the arbitration delay is less than a predetermined threshold, the uP cache controller waits for the arbitration delay when the interrupt occurs rather than return the jump op code for jumping to the parking routine.

FIG. 4B illustrates another embodiment of the present invention which is an extension of the flow diagram of FIG. 4A. In this embodiment, the buffer controller 32 is modified to transmit an arbitration status to the uP cache controller 30. If at step 50 an interrupt occurs while the uP cache controller 30 is waiting to access the buffer memory 12, the uP cache controller 30 evaluates the arbitration status received from the buffer controller 32 and returns the jump op code to the microprocessor 8 at step 56 only if the arbitration delay exceeds a predetermined threshold. Otherwise if the arbitration delay is less than the predetermined threshold at step 58, the uP cache controller 30 waits for the arbitration delay and then accesses the buffer memory 12. This embodiment improves performance by servicing an imminent uP cache controller 30 request before servicing the interrupt, which avoids the latency associated with jumping to the parking routine.

In yet another embodiment, after enabling the microprocessor 8 to execute the interrupt service routine (e.g., by returning the jump op code to the microprocessor 8) the uP cache controller 30 continues to assert the buffer access request to the buffer controller 32. In this manner, the uP cache controller 30 can transfer the requested data from the buffer memory 12 into the uP cache 10 while the microprocessor 8 executes the interrupt service routine. When the microprocessor 8 returns from the interrupt service routine, either the requested data will be waiting in the uP cache 10 for immediate access, or the uP cache controller 30 will still be waiting to access the buffer memory 12.

Figure 4C:
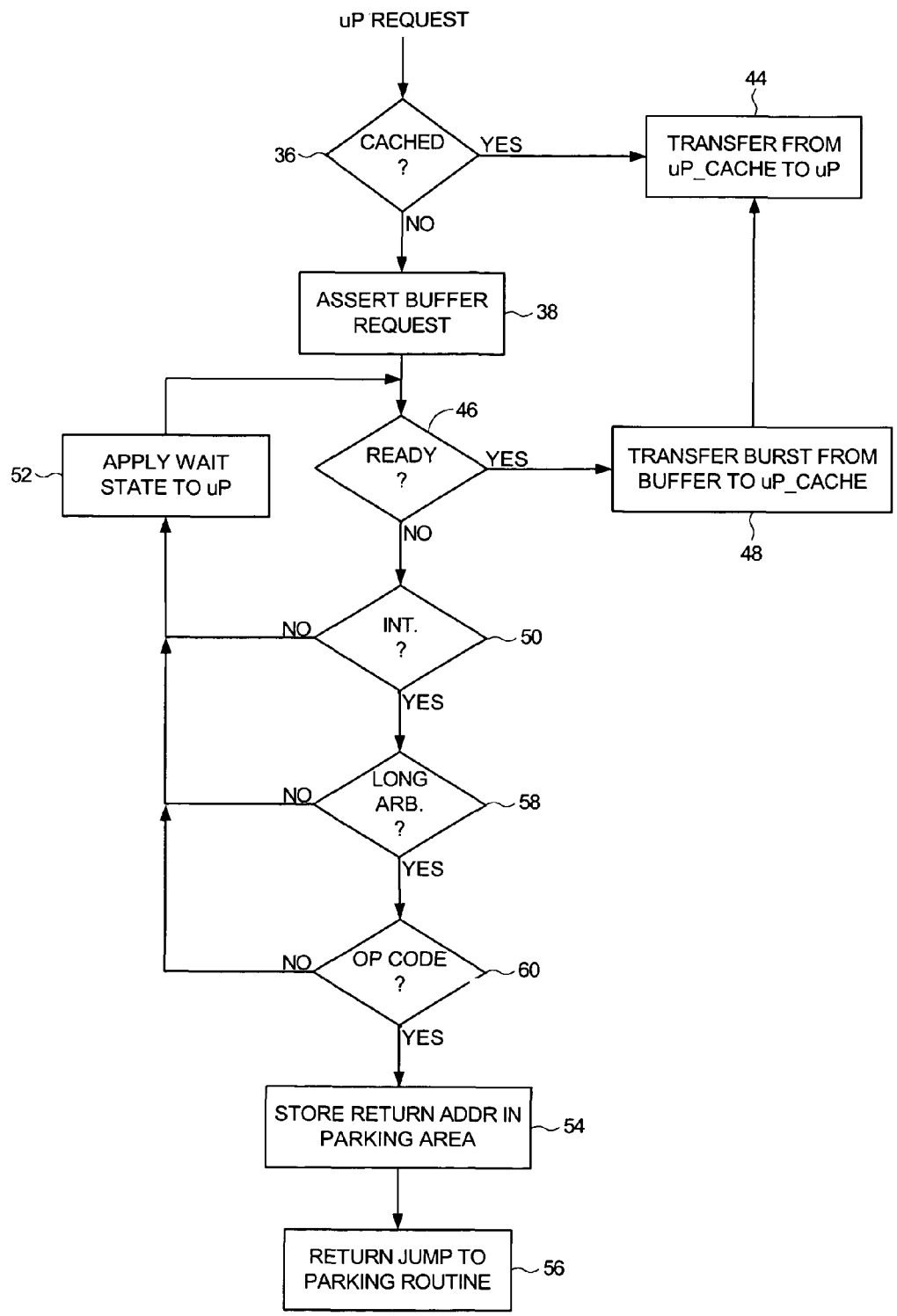
FIG. 4C is an extended flow diagram according to an embodiment of the present invention wherein if the microprocessor is waiting to read control routine data, the uP cache controller waits for the arbitration delay when the interrupt occurs rather than return the jump op code for jumping to the parking routine.

FIG. 4C illustrates yet another embodiment of the present invention which is an extension of the flow diagram of FIG. 4B. In this embodiment, the uP cache controller 30 only returns the jump op code if the microprocessor 8 was requesting a control routine op code from the uP cache controller 30 when the interrupt occurs. That is, the uP cache controller 30 will not return the jump op code if the microprocessor 8 is waiting to read control routine data. The flow diagram of FIG. 4C includes step 60 wherein the uP cache controller 30 continues waiting for the arbitration delay if the microprocessor 8 is not requesting a control routine op code. In one embodiment, the uP cache controller determines that the microprocessor 8 is requesting a control routine op code (as opposed to control routine data) based on the address of the access request.

In an alternative embodiment, if the microprocessor 8 is requesting control routine data when the interrupt occurs, the control circuitry 31 performs suitable operations to enable the microprocessor 8 to execute the interrupt service routine and return to the appropriate state (requesting the control routine data). In one embodiment, the parking routine may comprise additional op codes to facilitate the appropriate operations (e.g., saving context) to enable the microprocessor 8 to execute the interrupt service routine and then return to the state of waiting to read control routine data. In processors that support memory management, a memory exception can be asserted to cause the microprocessor 8 to vector to the parking routine and save the return address. For example, in an embodiment employing the ARM966 microprocessor, asserting the AHB Error signal during the access will cause a Prefetch Abort when interrupting an instruction fetch, and a Data Abort during a data access. In the case of the Data Abort, the instruction that has the Data Abort is "un-executed", which means that the parking routine only needs to return to re-execute the interrupted instruction. Status can be latched to allow the microprocessor 8 to distinguish this memory "fault" from other memory interface errors.

In yet another embodiment, the uP cache controller 30 is implemented so as to return only complete control routine op codes to the microprocessor 8. This prevents the situation where the microprocessor 8 is stalled waiting for the uP cache controller 30 to read a partial op code from the buffer memory 12 when the interrupt occurs. In one embodiment, the uP cache controller 30 monitors the control routine op codes cached in the uP cache 10 prior to transferring the control routine op codes to the microprocessor 8. If the uP cache controller 30 detects that a requested op code is a multi-word op code and the uP cache 10 contains only a portion of the op code, then the uP cache controller 30 will transfer control routine op codes from the buffer memory 12 into the uP cache 10 until the entire requested op code is present in the uP cache 10 prior to returning the op code to the microprocessor 8.

Figure 5A:
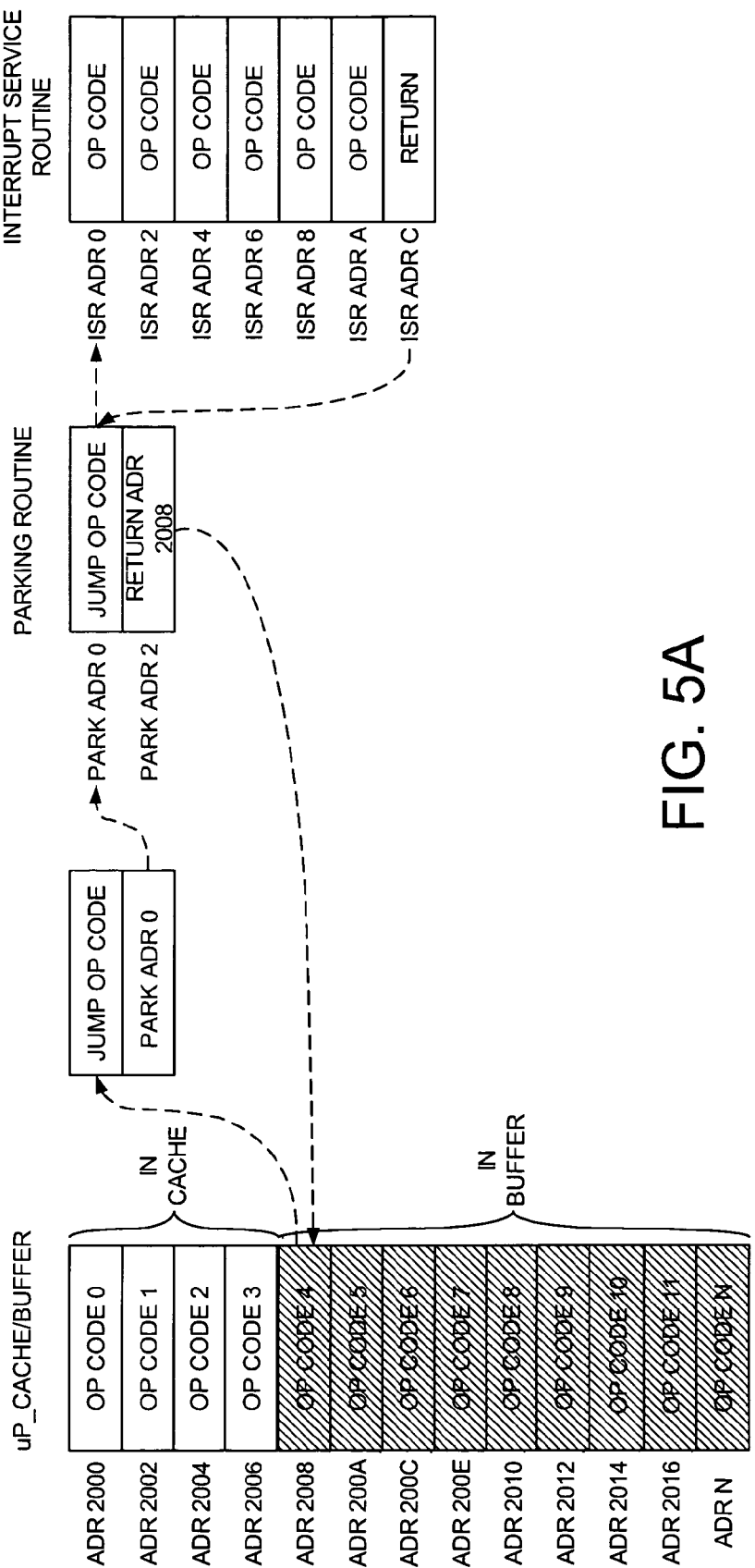
FIG. 5A illustrates the uP cache controller returning a jump op code to the microprocessor for jumping to a parking routine which enables the microprocessor to execute an interrupt service routine when an interrupt occurs.

A better understanding of the embodiment of the present invention wherein the microprocessor 8 is enabled to execute the interrupt service routine by returning a jump op code is understood with reference to FIG. 5A which shows a consecutive sequence of control routine op codes being executed by the microprocessor 8. A number of the control routine op codes are cached in the uP cache 10, and a number of the control routine op codes are stored in the buffer memory 12. When the microprocessor 8 requests the control routine op code at address 2008 (which is stored in the buffer memory 12), the uP cache controller 30 asserts an access request to the buffer controller 32. If during the arbitration delay an interrupt occurs, the uP cache controller 30 detects the interrupt and stores the return address (2008) at the end of the parking routine. The uP cache controller 30 then returns a jump op code to the microprocessor 8 to jump to the starting address (park adr 0) of the parking routine. After the microprocessor 8 jumps to the parking routine, it immediately jumps to the starting address of the interrupt service routine. In one embodiment (not shown), the parking routine comprises a number of no-ops to ensure the microprocessor 8 will jump to the interrupt service routine before returning from the parking routine. When the microprocessor 8 finishes executing the interrupt service routine, it returns to the parking routine where it jumps to the return address (2008) corresponding to the control routine op code it was waiting to read when the interrupt occurred.

In one embodiment, the starting address (park adr 0) of the parking routine is hardwired into the uP cache controller 30, and in an alternative embodiment, the uP cache controller comprises a programmable register for storing the starting address. In one embodiment, the op codes of the parking routine are stored in a reserved area of the uP cache 10, and the uP cache controller 30 writes the return address (2008 in FIG. 5A) by modifying the uP cache 10. The address where the uP cache 10 stores the return address may be hardwired or programmed into the uP cache controller 30.

Figure 5B:
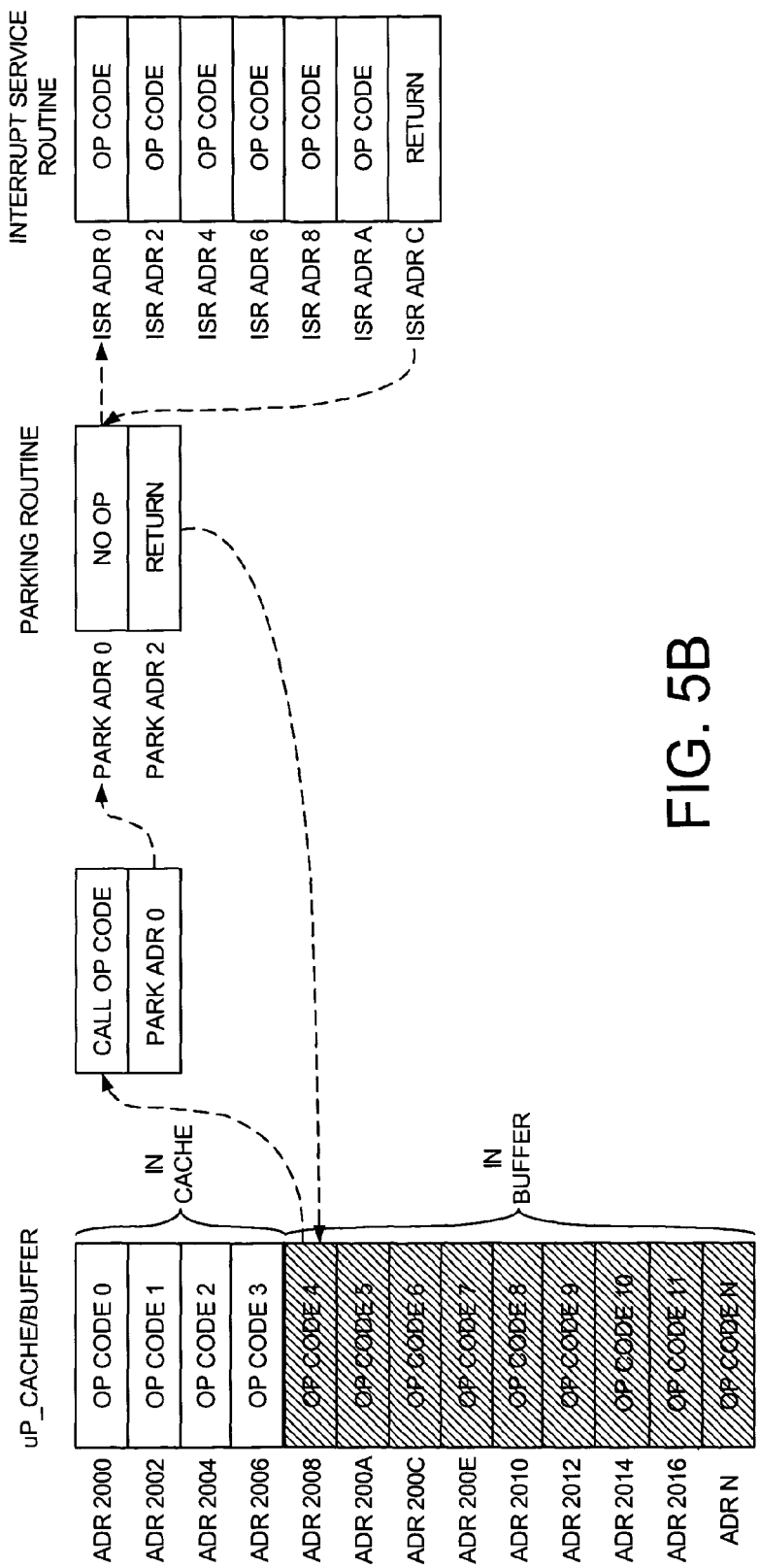
FIG. 5B shows an alternative embodiment of the present invention wherein the control circuitry enables the microprocessor to service the interrupt by returning a subroutine call to the microprocessor.

FIG. 5B illustrates an embodiment of the present invention wherein a subroutine call op code is returned to the microprocessor 8 to enable it to execute the interrupt service routine when an interrupt occurs. The subroutine call op code causes the microprocessor 8 to call the parking routine. In this embodiment, the parking routine has a normal return op code at the end which obviates the need to store the return address as in the embodiment of FIG. 5A. Also shown in this embodiment, the parking routine comprises a no op at the beginning to ensure the microprocessor 8 executes the interrupt service routine before returning from the parking routine.

Figure 6B:
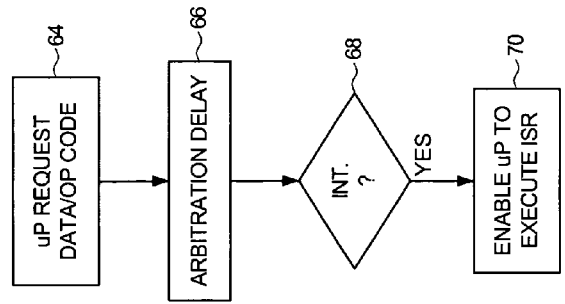
FIG. 6B is a flow diagram executed by the buffer controller of FIG. 6A for monitoring the interrupts and enabling the microprocessor to execute an interrupt service routine if an interrupt occurs while servicing an access request generated by the microprocessor.
Figure 6A:
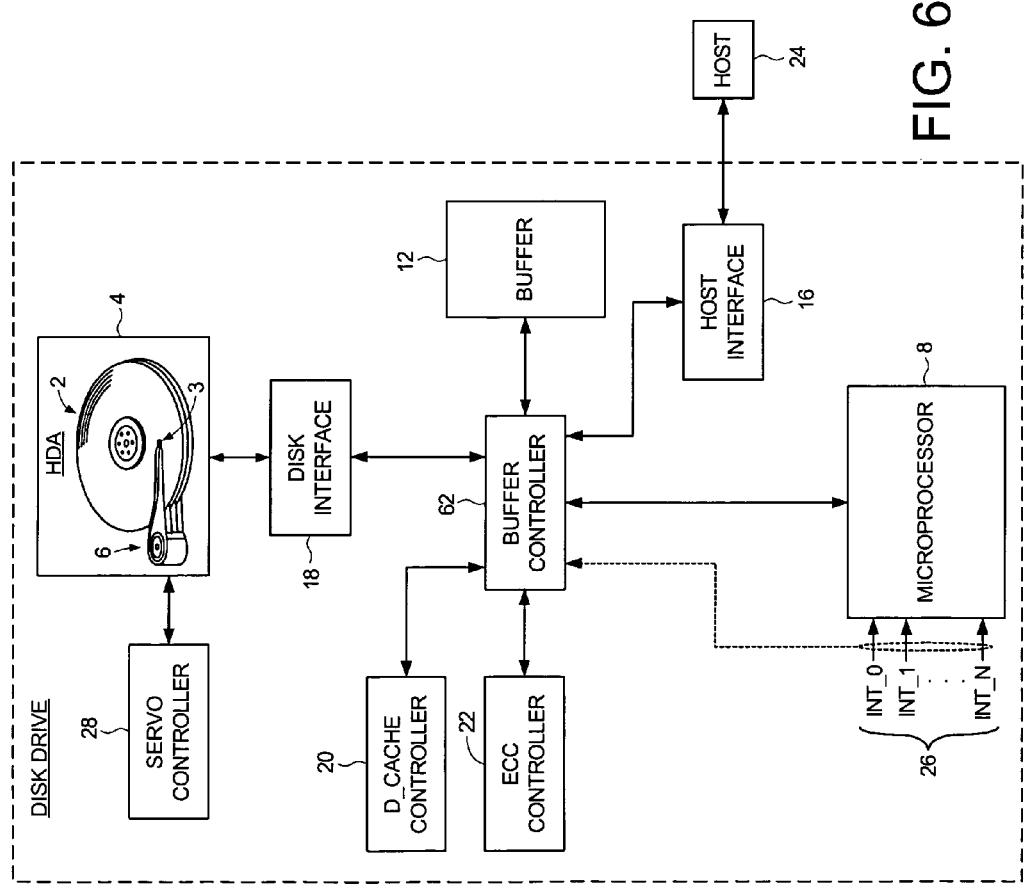
FIG. 6A shows a disk drive according to an embodiment of the present invention wherein the access request generated by the microprocessor is serviced by the buffer controller.

FIG. 6A shows another embodiment of the present invention wherein a buffer controller 62 services the access request from the microprocessor 8 directly (rather than through a uP cache controller as in FIG. 3A). Similar to the embodiment of FIG. 3A, an arbitration delay occurs when the microprocessor 8 waits for the buffer controller 62 to grant access to the buffer memory 12. In this embodiment, the buffer controller 62 is modified to monitor the interrupts 26 and enable the microprocessor 8 to execute an interrupt service routine if an interrupt occurs during the arbitration delay. Referring to the flow diagram of FIG. 6B, which is executed by the buffer controller 62, at step 64 the buffer controller 62 receives an access request from the microprocessor 8. At step 66 an arbitration delay occurs, and if an interrupt occurs at step 68 during the arbitration delay, then at step 70 the buffer controller 62 enables the microprocessor 8 to execute the corresponding interrupt service routine.

Figure 7B:
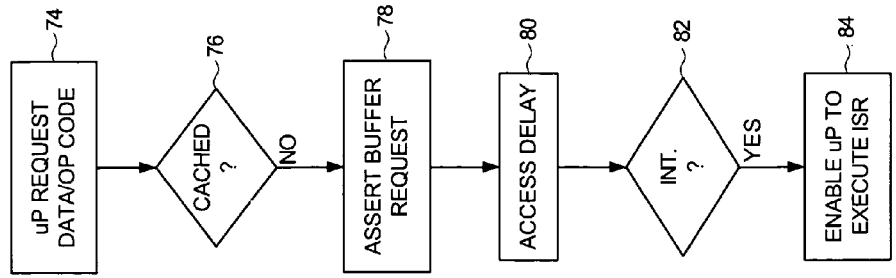
FIG. 7B shows a flow diagram executed by the control circuitry of FIG. 7A for monitoring the interrupts and enabling the microprocessor to execute an interrupt service routine if an interrupt occurs while servicing an access request generated by the microprocessor.
Figure 7A:
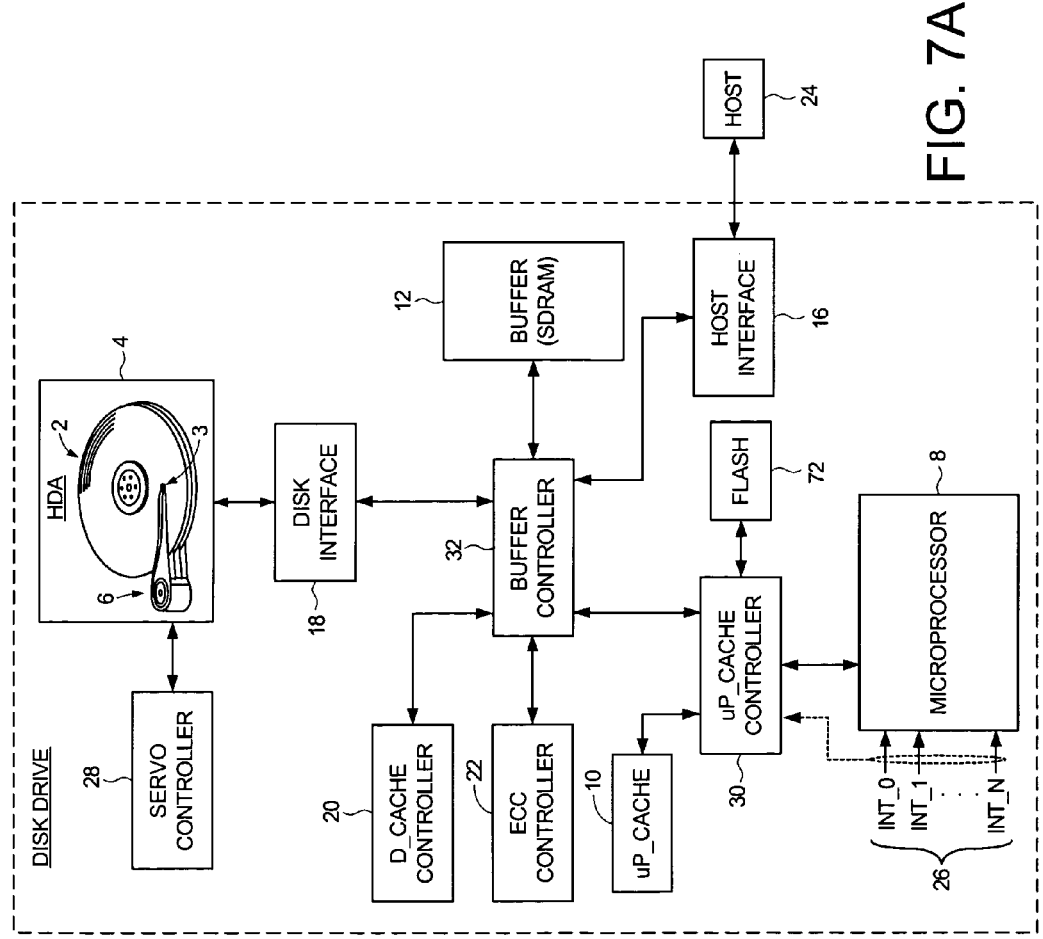
FIG. 7A shows a disk drive according to an embodiment of the present invention wherein the buffer memory comprises a FLASH memory, and the control circuitry transmits the control routine op codes from the FLASH memory to the uP cache.

The buffer memory 12 may comprise any suitable circuitry, such as a SDRAM in the embodiment of FIG. 3A. In an alternative embodiment shown in FIG. 7A, the buffer memory for storing the control routine op codes and control routine data comprises a FLASH memory 72 that is accessed directly by the uP cache controller 30 (no arbitration). In one embodiment, there is a significant access delay associated with accessing the FLASH memory 72, which may be implemented as a parallel device or serial device. If an interrupt occurs during the access delay, the uP cache controller 30 enables the microprocessor 8 to execute the corresponding interrupt service routine. Referring to the flow diagram of FIG. 7B, at step 74 the microprocessor 8 generates an access request, and if at step 76 the requested data is not cached in the uP cache 10, then at step 78 the uP cache controller 30 asserts a buffer request to access the FLASH memory 72. If during the access delay at step 80 an interrupt occurs at step 82, then at step 84 the uP cache controller 30 enables the microprocessor 8 to execute the corresponding interrupt service routine.

Figure 8:
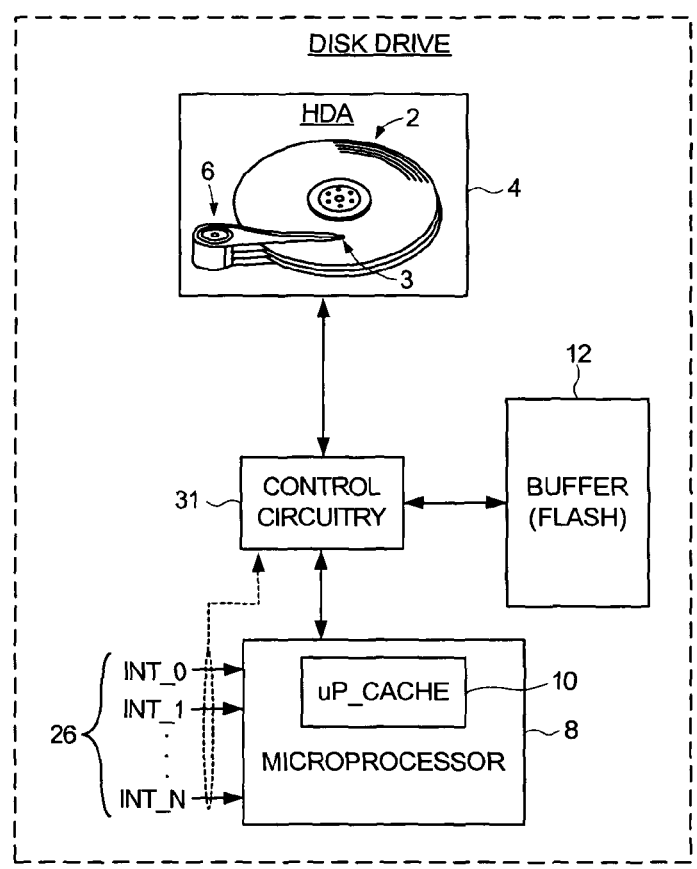
FIG. 8 shows an embodiment of the present invention wherein the buffer memory comprises a FLASH memory, and the uP cache is integrated into the microprocessor.

FIG. 8 shows yet another embodiment of the present invention wherein the buffer memory 12 comprises a FLASH memory, and the uP cache 10 is integrated into the microprocessor 8. The control circuitry 31 transmits the control routine op codes and control routine data from the buffer memory 12 to the uP cache 10. If an interrupt occurs during an arbitration delay (if the buffer memory 12 is shared) or if during an access delay (non-arbitrated delay), the control circuitry 31 enables the microprocessor 8 to execute the corresponding interrupt service routine.

We claim:

1. A disk drive comprising:
   (a) a disk;
   (b) a head actuated over the disk;
   (c) a buffer memory operable to store control routine op codes and control routine data;
   (d) a microprocessor operable to receive the control routine op codes and control routine data; and
   (e) control circuitry operable to:
      service an access request generated by the microprocessor by accessing the buffer memory;
      monitor at least one interrupt;
      if the interrupt occurs while servicing the access request, enable the microprocessor to execute an interrupt service routine corresponding to the interrupt; and
      execute the interrupt service routine prior to completing the access request.

2. The disk drive as recited in claim 1, wherein the control circuitry is further operable to assert a wait state to the microprocessor while servicing the access request.

3. The disk drive as recited in claim 1, wherein the control circuitry is further operable to enable the microprocessor to execute the interrupt service routine by returning a jump op code to the microprocessor for jumping to a parking routine.

4. The disk drive as recited in claim 3, wherein:
   (a) the control circuitry is further operable to store a return address in the parking routine; and
   (b) the return address corresponds to an address of an op code the microprocessor was waiting to receive when the interrupt occurred.

5. The disk drive as recited in claim 1, wherein:
   the disk drive further comprises a microprocessor (uP) cache operable to cache the control routine op codes read from the buffer memory;
   the control circuitry further comprises a uP cache controller operable to transmit the control routine op codes from the buffer memory to the uP cache;
   the control circuitry further comprises a buffer controller operable to arbitrate access to the buffer memory by the uP cache controller and at least one other component; and
   an arbitration delay occurs when the uP cache controller waits for the buffer controller to grant access to the buffer memory.

6. The disk drive as recited in claim 5, wherein if the arbitration delay is less than a predetermined threshold, the control circuitry is further operable to wait for the arbitration delay when the interrupt occurs rather than enable the microprocessor to execute the interrupt service routine.

7. The disk drive as recited in claim 5, wherein if the uP cache controller is waiting to read the control routine data from the buffer memory, the control circuitry is further operable to wait for the arbitration delay when the interrupt occurs rather than enable the microprocessor to execute the interrupt service routine.

8. The disk drive as recited in claim 5, wherein the uP cache controller is further operable to transfer only complete control routine op codes from the uP cache to the microprocessor.

9. The disk drive as recited in claim 5, wherein the at least one other component includes at least one of a disk interface, a host interface, a data cache controller, and an error correction code (ECC) controller.

10. The disk drive as recited in claim 1, wherein:
   (a) the buffer memory comprises a FLASH memory;
   (b) the disk drive further comprises a uP cache operable to cache the control routine op codes read from the FLASH memory; and (c) the control circuitry is further operable to transmit the control routine op codes from the FLASH memory to the uP cache.

11. A method of reducing interrupt latency in a disk drive, the disk drive comprising a disk, a head actuated over the disk, a buffer memory operable to store control routine op codes and control routine data, a microprocessor operable to receive the control routine op codes and control routine data, the method comprising the steps of:
   (a) the microprocessor generating an access request;
   (b) servicing the access request generated by the microprocessor by accessing the buffer memory; and
   (c) if an interrupt occurs while servicing the access request, enabling the microprocessor to execute an interrupt service routine corresponding to the interrupt; and
   (d) executing the interrupt service routine prior to completing the access request.

12. The method as recited in claim 11, further comprising the step of asserting a wait state to the microprocessor while servicing the request.

13. The method as recited in claim 11, wherein the step of enabling the microprocessor to execute the interrupt service routine comprises the step of returning a jump op code to the microprocessor for jumping to a parking routine.

14. The method as recited in claim 13, wherein the step of enabling the microprocessor to execute the interrupt service routine further comprises the step of storing a return address in the parking routine, wherein the return address corresponds to an address of an op code the microprocessor was waiting to receive when the interrupt occurred.

15. Control circuitry for use in an information storage device, the information storage device comprising a buffer memory operable to store control routine op codes and control routine data, and a microprocessor operable to receive the control routine op codes and control routine data, the control circuitry operable to:
   service an access request generated by the microprocessor by accessing the buffer memory;
   monitor at least one interrupt; and
   if the interrupt occurs while servicing the access request, enable the microprocessor to execute an interrupt service routine corresponding to the interrupt; and
   execute the interrupt service routine prior to completing the access request.

16. The control circuitry as recited in claim 15, wherein the control circuitry is further operable to assert a wait state to the microprocessor while servicing the access request.

17. The control circuitry as recited in claim 15, wherein the control circuitry is further operable to enable the microprocessor to execute the interrupt service routine by returning a jump op code to the microprocessor for jumping to a parking routine.

18. The control circuitry as recited in claim 17, wherein:
   the control circuitry is further operable to store a return address in the parking routine; and
   the return address corresponds to an address of an op code the microprocessor was waiting to receive when the interrupt occurred.

19. The control circuitry as recited in claim 15, wherein:
   the control circuitry further comprises a uP cache operable to cache the control routine op codes read from the buffer memory;
   the control circuitry further comprises a uP cache controller operable to transmit the control routine op codes of the control routine from the buffer memory to the uP cache;
   the control circuitry further comprises a buffer controller operable to arbitrate access to the buffer memory by the uP cache controller and at least one other component; and
   an arbitration delay occurs when the uP cache controller waits for the buffer controller to grant access to the buffer memory.

20. The control circuitry as recited in claim 19, wherein if the arbitration delay is less than a predetermined threshold, the control circuitry is further operable to wait for the arbitration delay when the interrupt occurs rather than enable the microprocessor to execute the interrupt service routine.

21. The control circuitry as recited in claim 19, wherein if the uP cache controller is waiting to read the control routine data from the buffer memory, the control circuitry is further operable to wait for the arbitration delay when the interrupt occurs rather than enable the microprocessor to execute the interrupt service routine.

22. The control circuitry as recited in claim 19, wherein the uP cache controller is further operable to transfer only complete control routine op codes of the control routine from the uP cache to the microprocessor.

23. The control circuitry as recited in claim 19, wherein the at least one other component includes at least one of a disk interface, a host interface, a data cache controller, and an error correction code (ECC) controller.

24. The control circuitry as recited in claim 15, wherein the buffer memory is operable to store user data received from a host and written to the disk during a write operation, and user data read from the disk and transferred to the host during a read operation.

25. The control circuitry as recited in claim 15, wherein:
   the buffer memory comprises a FLASH memory;
   the information storage device further comprises a uP cache operable to cache the control routine op codes read from the FLASH memory; and
   the control circuitry is further operable to transmit the control routine op codes from the FLASH memory to the uP cache.

* * * * *